INVENTOR
William F. King
BY L. D. Burch
ATTORNEY

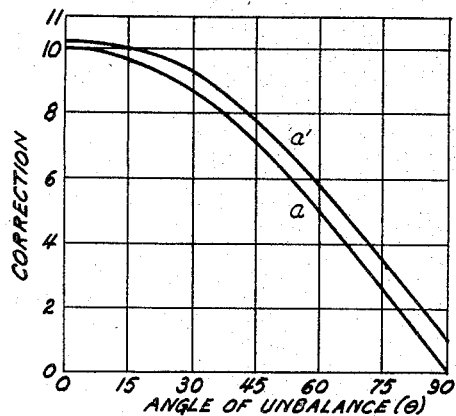
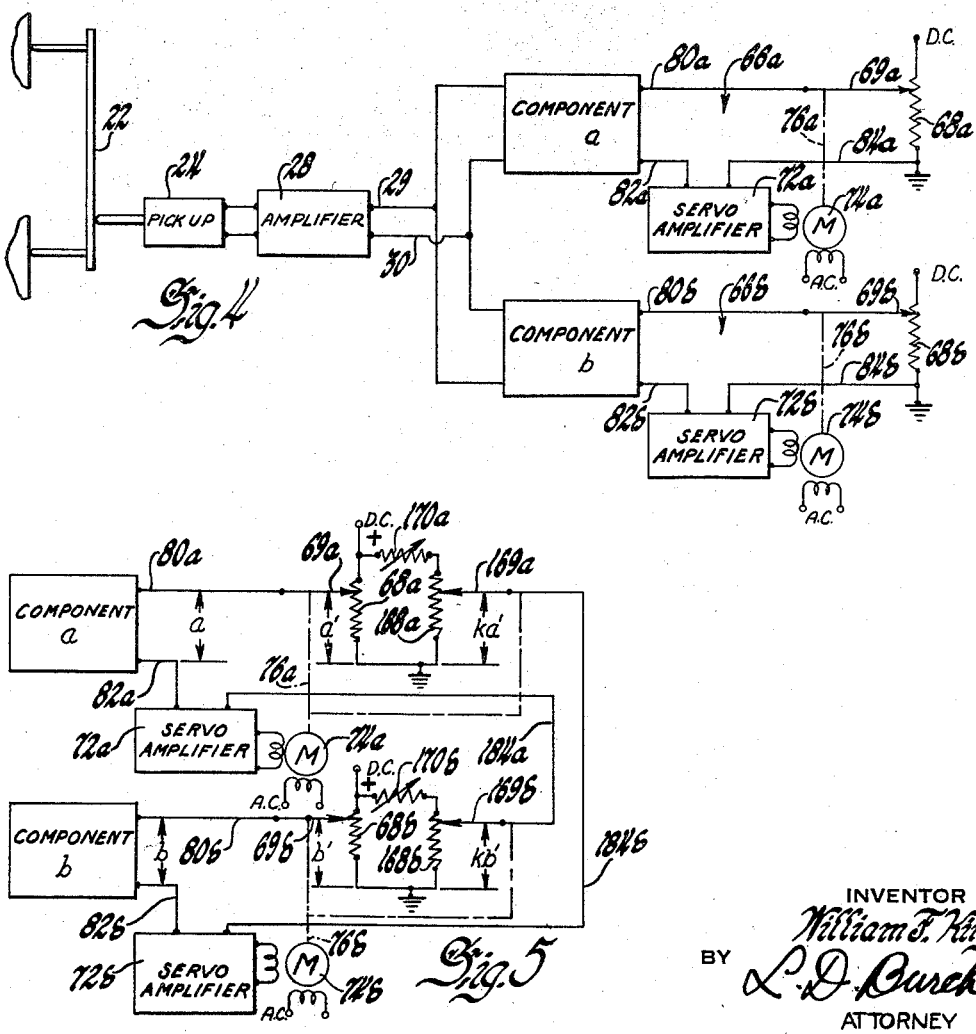

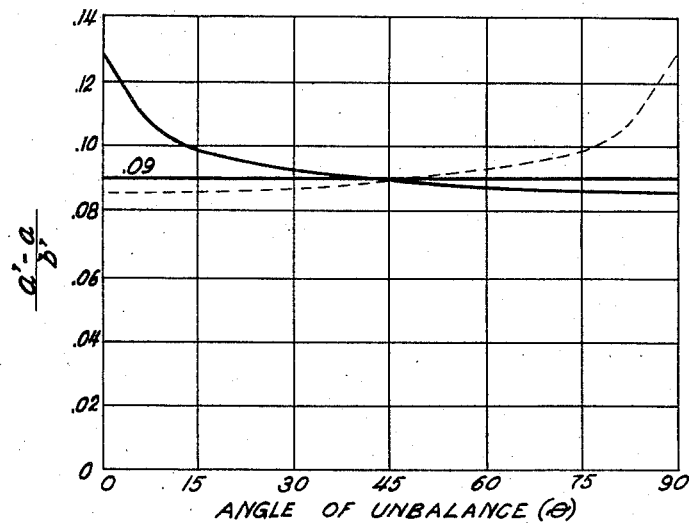
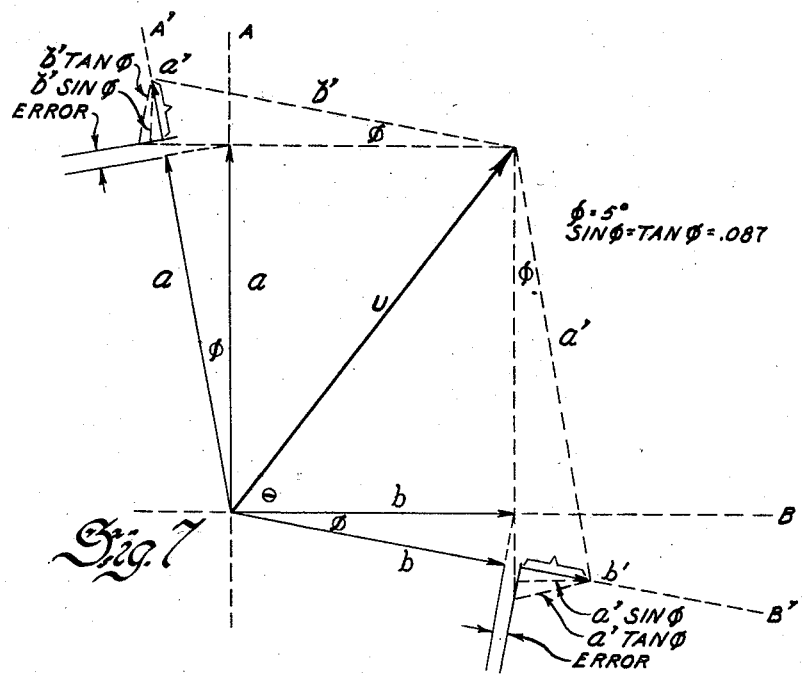

United States Patent Office 2,872,819
Patented Feb. 10, 1959

2,872,819

APPARATUS FOR COMPENSATING QUADRATURE RESOLVED UNBALANCE COMPONENTS

William F. King, Oak Park, Mich., assignor to General Motors Corporation, Detroit, Mich., a corporation of Delaware Application April 1, 1954, Serial No. 420,280

5 Claims. (Cl. 73—462)

This invention relates to automatic balancing installations and, more particularly, to apparatus for compensating quadrature or conjugately resolved components of a total unbalance quantity to permit balance corrections to be made at points spaced other than 90 degrees apart.

The invention is specially suited for use in automatic balancing installations in which the total unbalance in a selected transaxial plane of correction of a dynamically unbalanced rotating body is vectorially resolved into two components and a balance correction performed therefor at two predetermined points spaced a fixed angular distance apart on the surface of the body. An automatic balancing installation of this character adapted to effect unbalance determinations and balance corrections in elongated rotating bodies such as crankshafts and the like is shown and described in Patent No. 2,783,649, issued March 5, 1957 in the name of Lawrence F. Hope, and assigned to the present assignee. In this apparatus a rough balance correction is performed at two quadrature related, transaxial coplanar points on the cheek of selected counterweights of an engine crankshaft.

It is sometimes desirable to perform such balance corrections at angles other than 90 degrees apart, as where it is desired to perform a subsequent finish or assembly balance of a crankshaft after it has been installed in an engine in order to correct for any unbalance effects thereon due to other parts of the engine. In such event a small amount of rough unbalance, say about 0.5 oz.-inches, is intentionally left in the shaft in order to control within limits the approximate location of the finish assembly unbalance, which occurs at a variable angle relative to an axial reference plane of the shaft. Therefore, it is desirable that the points at which the rough balance correction is performed be spaced as widely apart as possible in order to provide a long unobstructed sector on the cheek of the crankshaft and to assure that the finished balance correction will fall somewhere between the rough balance correction points.

Accordingly, the present invention has for its general object to provide apparatus for compensating quadrature resolved components of an unbalance quantity to permit balance corrections at angles different from 90 degrees or $\pi/2$ radians.

The manner in which the foregoing is accomplished will appear from the following detailed description and drawings in which:

Figs. 2 and 7 are vector diagrams useful in understanding the principle of the present invention;

Figs. 3 and 6 are curves relating to the theory of the present invention;

Fig. 4 is a part of apparatus of the type illustrated in Fig. 1; and

Fig. 5 is a modification of the apparatus of Figs. 1 and 4 in accordance with present invention.

Figure 1:
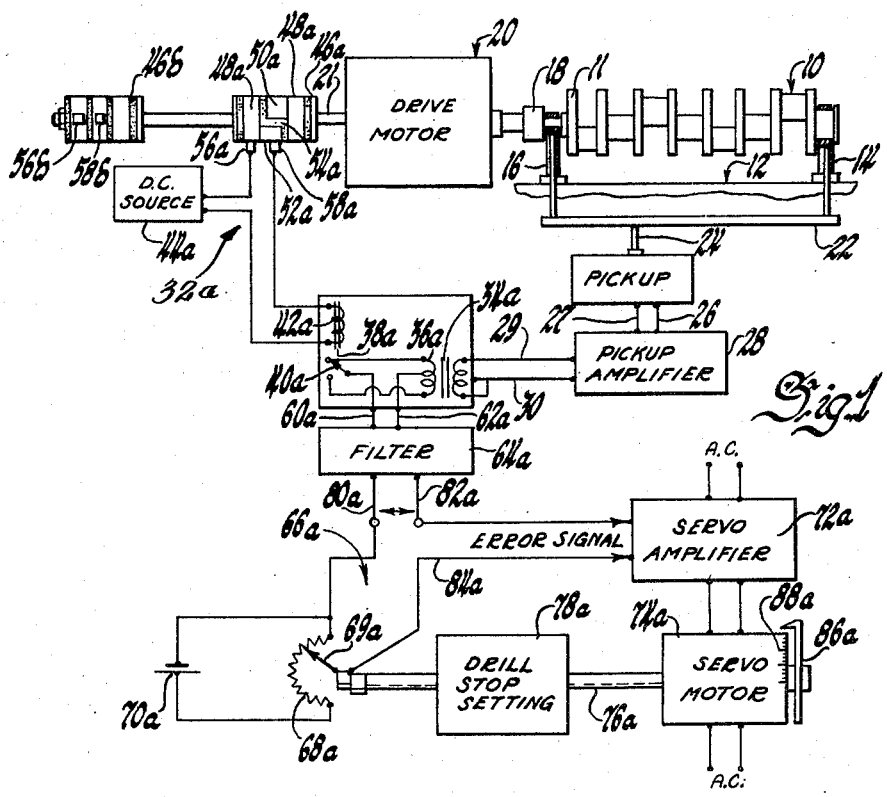
Fig. 1 is a schematic and block diagrammatic showing of a form of balancing apparatus in which the present invention may be employed.

Referring to Fig. 1 of the drawings, the body to be balanced is shown as a crank shaft 10 mounted in a fixture 12 which includes a pair of resilient or oscillatable supports 14, 16 that permit vibration of the ends of the shaft in an axial plane thereof. The shaft is coupled through a suitable coupling arrangement 18 to be driven by a constant speed drive motor 20. Coupled to the supported ends of the shaft is a mechanical nodal bar 22 having an electrical pickup 24 positioned at one of the mechanical nodes thereof.

No attempt has been made to show any particular construction of mounting supports and coupling for the shaft and the nodal bar, the drawings being for the most part of a diagrammatic nature to bring out principles of operation rather than particular details of construction. However, reference is made to U. S. Patent 2,293,371 in the name of T. C. Van Degrift assigned to the present assignee illustrating and describing a suitable mounting and nodal bar construction which can be adapted for use in the foregoing apparatus.

The electrical pickup 24 generates an alternating current signal representative of the total unbalance quantity in a selected correction plane through a counterweight 11 of the shaft. The pickup signal is applied over conductors 26, 27 and amplified in a suitable amplifier 28 from which it is applied over conductors 29, 30 to a commutation or equivalent integrating arrangement 32a. Following the amplifier 28, the numerical designation of the elements of the balancing installation herein illustrated will be accompanied by the lower case letters $a$ or $b$ whereby they may be identified with the particular unbalance component $a$ or $b$, as in Fig. 2 for example, being determined thereby.

The commutation arrangement 32a may include an input transformer 34a having a center-tapped secondary winding 36a, a relay switching element 38a having a two-position switch arm 40a and an activating coil 42a energized from a D. C. source 44a through a mechanical commutator 46a comprising one or more continuous rings 48a and a pair of split rings 50a, 52a separated by an insulating segment 54a. The commutator 46a is coupled to rotor shaft 21 of the drive motor to be driven in synchronism with crank shaft 10 and has a pair of stationary brushes 56a, 58a associated with the continuous ring and the two split rings, respectively. The commutator 46a functions to interrupt the energization of the relay activating coil 42a for a 180 degree interval of the pickup signal so as to produce a commutated or interrupted wave the average value of which is proportional to the amplitude of the pickup signal and the angular location of the commutator brushes 56a, 58a relative to the axial plane containing the total unbalance. A suitable form of electronic integrating device that may be employed in place of the electro-mechanical commutation arrangement herein is illustrated in Patent No. 2,783,907, issued April 9, 1957, in the name of the present inventor and assigned to the present assignee.

The output of the commutation arrangement is applied over conductors 60a, 62a to a ripple smoothing filter 64a and then to a self balancing amplitude comparison circuit 66a comprising an adjustable potentiometer device 68a connected across a standard reference D. C. source 70a, a conventional servo amplifier 72a and a two phase servomotor 74a. The rotor shaft 76a of the servomotor 74a is coupled to the adjustable arm 69a of the potentiometer device and to an adjustable drill stop setting device 78a that may be electrically or mechanically associated with an adjacent or remotely located drilling organization (not shown) or equivalent apparatus with which the balance correction may be performed.

Figure 2:
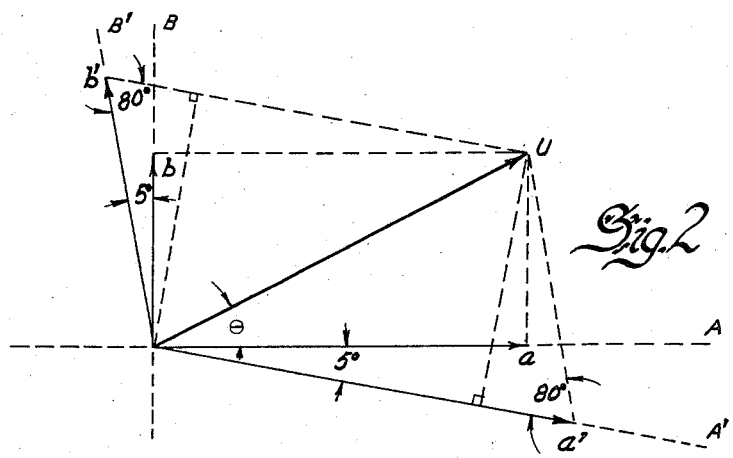

The filtered signal appearing between the conductors 80a, 82a represents the amplitude of the $a$ component of the total unbalance U of Fig. 2 and is compared in the amplitude comparison circuit 66a against that portion of the known potential of the standard reference source 70a appearing between conductor 80a and the potentiometer arm 69a of the potentiometer device. The net difference signal between these quantities is applied as an error signal over loop closing conductors 82a and 84a to the input of the servo amplifier 72a whose output is applied to the control phase winding of the two-phase servo motor to control the direction and extent of rotation thereof. The angular rotation of the servo motor 74a is proportional to the amplitude of the unbalance component and may be determined from a suitable pointer 86a mounted on the servomotor shaft 76a and a scale 88a calibrated in oz.-inches on the stator casing thereof.

Another commutator or equivalent device 46b having brushes 56b, 58b spaced 90 degrees relative to the brushes of commutator 46a is mounted on the shaft 21 of the drive motor 20 for association with a commutation arrangement, filter and amplitude comparison circuit similar to that associated with commutator 46a and serves to provide an automatic determination of the other unbalance component $b$ conjugately or orthogonally related to the unbalance component $a$. The above described arrangement for obtaining both of the unbalance components is shown somewhat more completely in the diagrammatic illustration of Fig. 4 in which the blocks labelled Component $a$ and Component $b$ in the branch circuits include the above described commutating arrangement and filter. Instead of employing separate reference sources for the balancing potentiometers 68a and 68b, a single reference source may be employed for both of the potentiometers, the high potential sides of which may be connected to the positive terminal of the reference source whose negative terminal is grounded.

In accordance with the present invention a compensating cross-correction network is added to the apparatus of Figs. 1 and 4 to permit the drilling of balance holes at included angles other than 90 degrees. Before proceeding with the description of the compensating network, the following analysis is given to illustrate the theory underlying the invention and as applied to a specific example where the included angle is 100 degrees.

The vector diagram of Fig. 2 shows an unbalance force U at an angle $\theta$ (theta) resolved into two sets of component $a$, $b$ and $a'$, $b'$ having included angles of 90 degrees and 100 degrees, respectively, therebetween. Methematically these components may be represented by the following equations:

$$a = U \cos \theta \quad (1)$$
$$b = U \sin \theta \quad (2)$$
$$a' = U\left[\cos(\theta+5) + \frac{\sin(\theta+5)}{\tan 80°}\right] \quad (3)$$
$$b' = U\left[\cos(95-\theta) + \frac{\sin(95-\theta)}{\tan 80°}\right] \quad (4)$$

Assuming values of $\theta$ in 15 degree increments between 0° and 90°, the following tabulation of figures contained in Table 1 are obtained:

68b through suitable voltage dropping resistors 170a and 170b, as shown in Fig. 5. The arms 169a and 169b of the auxiliary potentiometers are operatively coupled to be driven from the shafts 76a and 76b of the servomotors 74a and 74b, respectively. Electrically, arm 169a of auxiliary potentiometer 168a is connected over conductor 184b to one terminal of servo amplifier 72b, while arm 169b of auxiliary potentiometer 168b is connected over conductor 184a to the corresponding terminal of servo amplifier 72a. The auxiliary potentiometers 168a, 168b thus are mechanically associated with the servomotor drive of a respective one of the component networks but are electrically cross-connected or associated with respectively opposite component networks.

Rotation of the servomotor 74a in the component $a$ circuit will inject a compensating voltage and cause a change in voltage in the component $b$ circuit, and similarly with servomotor 74b. These compensating voltages ($ka'$ and $kb'$) are a fixed percentage of the main balancing voltages $a'$ and $b'$ appearing between the respective arms 69a and 69b and ground of the main potentiometers 68a and 68b and thus either add or subtract a percentage voltage to the opposite component circuit for a given change in either of the main potentiometers.

This modified circuit would be useful in adding the extra drill depth required for balancing at 100 degrees provided that the required increase in magnitude of one balancing force due to the drilling angle change were proportional to the required balancing force at 100 degrees of the other component, or, stated mathematically, provided that the following relations should apply:

$$a' = a + kb' \quad (5)$$
$$b' = b + ka' \quad (6)$$

To check this, the ratios $$\frac{a'-a}{b'}$$

and $$\frac{b'-b}{a'}$$

were computed, since these values would be indicative of the relationship between the change in balancing force magnitude with the change in drilling angle and the total correction required for the respective components. These ratios are tabulated in Table 2 below, and a plot of the ratio $$\frac{a'-a}{b'}$$

is shown in Fig. 6.

| $\theta$ | (a) Cos $\theta$ | (b) Sin $\theta$ | Cos $\theta$+5 | Sin $\theta$+5 | $\frac{\text{Sin }\theta+5}{\text{Tan }80}$ | $a'$ | Cos 95−$\theta$ | Sin 95−$\theta$ | $\frac{\text{Sin }95-\theta}{\text{Tan }80}$ | $b'$ |
|---|---|---|---|---|---|---|---|---|---|---|
| 0 | 1.0000 | 0.0000 | 0.9962 | 0.0872 | 0.0154 | 1.0116 | −0.0872 | 0.9962 | 0.1757 | 0.0885 |
| 15 | 0.9659 | 0.2588 | 0.9397 | 0.3420 | 0.0603 | 1.0000 | 0.1736 | 0.9848 | 0.1737 | 0.3473 |
| 30 | 0.8660 | 0.5000 | 0.8192 | 0.5736 | 0.1011 | 0.9203 | 0.4226 | 0.9063 | 0.1598 | 0.5824 |
| 45 | 0.7071 | 0.7071 | 0.6428 | 0.7660 | 0.1351 | 0.7779 | 0.6428 | 0.7660 | 0.1351 | 0.7779 |
| 60 | 0.5000 | 0.8660 | 0.4226 | 0.9063 | 0.1598 | 0.5824 | 0.8192 | 0.5736 | 0.1011 | 0.9203 |
| 75 | 0.2588 | 0.9659 | 0.1736 | 0.9848 | 0.1737 | 0.3473 | 0.9063 | 0.3420 | 0.0603 | 1.0000 |
| 90 | 0.0000 | 1.0000 | −0.0872 | 0.9962 | 0.1757 | 0.0885 | 0.9962 | 0.00872 | 0.0154 | 1.0116 |

Fig. 3 shows the $a$ and $a'$ components taken from Table 1 plotted as a function of the angle $\theta$ of the total unbalance force U. From these curves it may be noted that the required correction increment due to the wider angle is not constant, but varies with the angle $\theta$.

The cross correction compensating circuit in accordance with the present invention employs a pair of auxiliary potentiometers 168a and 168b which are connected across respective main balancing potentiometers 68a and

| Angle | $a'-a$ | $b'-b$ | $\frac{a'-a}{b'}$ | $\frac{b'-b}{a'}$ |
|---|---|---|---|---|
| 0 | 0.0116 | 0.0885 | 0.1311 | 0.0875 |
| 15 | 0.0341 | 0.0885 | 0.0982 | 0.0885 |
| 30 | 0.0543 | 0.0824 | 0.0931 | 0.0895 |
| 45 | 0.0708 | 0.0708 | 0.0910 | 0.0910 |
| 60 | 0.0824 | 0.0543 | 0.0895 | 0.0932 |
| 75 | 0.0885 | 0.0341 | 0.0885 | 0.0982 |
| 90 | 0.0885 | 0.0116 | 0.0875 | 0.1311 |

From this table a value of 0.09 was chosen as an average value of the above ratios representing the factor $k$ of Equations 5 and 6. By making the voltage dividing resistances 170a, 170b ten times as large as the resistance of the auxiliary potentiometers 168a, 168b, the circuit of Fig. 5 will inject a compensating voltage into one component network equal to 9% of the main balancing voltage ($a'$ or $b'$) of the other component network and thus correct or compensate the quadrature related signal components $a$ and $b$ appearing between conductors 80a, 82a and 80b, 82b of Fig. 5 to yield a close approximation for a balance correction to be performed at the larger included angle of 100 degrees. The error due to using this method of using a fixed value for the quantity $k$ to approximate $a'$ and $b'$ is shown in Table 3 below based on a 12 oz.-in. unbalance. The error in $a'$ would be $a'-(a+.09b')$, where $a'$ is taken from Table 1.

| Angle | $a$ | $.09\,b'$ | $a+.09b'$ | Error | X12 oz. in. | Percent Error |
|---|---|---|---|---|---|---|
| 0 | 1.0000 | .00797 | 1.0080 | 0.0036 | −0.043 | −0.36 |
| 15 | 0.9659 | 0.03126 | 0.9972 | 0.0028 | −0.034 | −0.28 |
| 30 | 0.8660 | 0.0524 | 0.9184 | 0.0019 | −0.023 | −0.19 |
| 45 | 0.7071 | 0.0700 | 0.7771 | 0.0008 | −0.010 | −0.08 |
| 60 | 0.5000 | 0.0828 | 0.5828 | −0.0004 | +0.005 | +0.04 |
| 75 | 0.2588 | 0.0900 | 0.3488 | −0.0015 | +0.018 | +0.15 |
| 90 | 0.0000 | 0.0910 | 0.0910 | −0.0025 | +0.030 | +0.25 |

As shown in Table 3, the absolute and percentage error due to using a constant percent correction is of small enough magnitude to make the method usable.

Another approach may be made to the problem by considering Fig. 7. Component $a$ is rotated counterclockwise to the $A'$ axis, which is displaced by an angle $\phi$ (phi) of 5 degrees from the vertical A axis. The vector ($b' \sin \phi$) corresponds to an addition of a percentage of vector $b'$ to vector $a$, which in the specific case discussed is 0.087 or 8.7% of the length of vector $b'$. This vector quantity plus vector $a$ falls short of equalling vector $a'$, the required correction, by the slight error indicated on the drawing. It will be seen that the correction is always less than that required for exact balance. For this reason, an average value of 0.09 or 9% was chosen to reduce the error and make it both a plus and minus one. The same analysis may be performed on the B axis with corresponding results.

With the system of cross correction thus described, drilling balance holes at an angle of 100 degrees, rather than 90 degrees, will produce an error of less than 0.4% balance. In terms of a 12 ounce-inch correction this error would be less than 0.05 ounce-inch, which is well within the correction limit requirements of most industrial balancing applications. As an academic matter, where an extremely high degree of accuracy is sought to be obtained, the variable nature of the incremental compensating quantity could be accounted for by various expedients, as by using a cam having a configuration corresponding to the variable quantity and associated follower in the mechanical couplings or linkages between the servo motors and the arms of the auxiliary potentiometers.

While the invention has been described as applied to a specific included angle of 100 degrees, the method of analysis can be extended to and the compensating apparatus employed to perform balance corrections at other angles.

I claim:
1. The combination with apparatus for analyzing an unbalance force of an unbalanced rotating body into two components and including vibration pickup means developing an electrical signal having characteristics related to said unbalance and component analyzing means resolving said unbalance force into two quadrature related components, said analyzing means being connected to said vibration pickup means and having a pair of branch circuits providing signal outputs corresponding in magnitude to said quadrature related components, of means for modifying said quadrature related components to permit balance correction for said unbalance force at a pair of fixed points on said body having an included angle different from 90 degrees therebetween comprising an adjustable compensating network having a pair of circuit branches cross-connected in the output circuits of said component analyzing means.

2. In combination, a source of potential and a pair of amplitude comparison circuits, each of said circuits having a pair of input terminals adapted to be interconnected with signal sources, a pair of main balancing potentiometers each connected across said potential source and having an adjustable arm connected to one of the input terminals of a respective one of said amplitude comparison circuits, means responsive to a signal and operatively interconnected with said arm to be effective to actuate said arm in response to said signal, and a pair of auxiliary potentiometers each connected across said potential source and having an adjustable arm mechanically coupled to the adjustable arm of a main balancing potentiometer in one of said amplitude comparison circuits for movement therewith and electrically connected to supply a voltage in a circuit connected to the other input terminal of the opposite amplitude comparison circuit.

3. Apparatus for analyzing an unbalance force of an unbalanced rotating body into two components comprising, in combination, vibration pickup means developing an electrical signal having characteristics related to said unbalance force, component analyzing means resolving said unbalance force into a pair of quadrature related components, said analyzing means being connected to said vibration pickup means and having a pair of branch output circuits providing signal outputs corresponding in magnitude to said quadrature related components, a separated servo controlled balancing system for each of said branch circuits including a main balancing potentiometer connected in differential opposed circuit relation with the said signal output of a respective one of said branch circuits, a servo amplifier connected to receive the difference signal between said main balancing potentiometer and the signal output of a branch circuit, and a servomotor controlled from said servo amplifier and coupled to adjust the output of said main balancing potentiometer, and means for modifying said quadrature related components to permit balance correction for said unbalance force at a pair of fixed points on said body having an included angle different from 90 degrees therebetween, said means including a pair of auxiliary potentiometers connected across respective ones of said main balancing potentiometers, each of said auxiliary potentiometers being individually mechancally coupled for adjustment by the servomotor associated with the main balancing potentiometer across which each auxiliary potentiometer is connected and being electrically connected to inject a compensating voltage in the branch circuit in which the other main balancing potentiometer is connected.

4. The combination with apparatus for resolving an unbalance force of an unbalanced rotating body into two components and including vibration pickup means developing an electrical signal having characteristics related to said unbalance and component analyzing means resolving said unbalance force into two quadrature related components, said analyzing means being connected to said vibration pickup means and having a pair of branch circuits providing signal outputs corresponding in magnitude to said quadrature related components, of means for modifying said quadrature related components to permit balance correction for said unbalance force at a pair of fixed points on said body having an included angle different from 90 degrees therebetween, said modifying means comprising a source of potential and a pair of amplitude comparison circuits each having a pair of input terminals, a pair of main balancing potentiometers each connected to said potential source and having an adjustable arm connected to one of the input terminals of a respective one of said amplitude comparison circuits, and a pair of auxiliary potentiometers each connected to said potential source and having an adjustable arm mechanically coupled to the adjustable arm of a main balancing potentiometer in one of said amplitude comparison circuits and electrically connected to supply a voltage in a circuit connected to the other input terminal of the opposite amplitude comparison circuit.

5. In combination, a source of potential and a pair of amplitude comparison circuits, each of said circuits having a pair of input terminals, a main balancing potentiometer in each of said circuits connected across said potential source and having an adjustable arm connected to one of the input terminals in its circuit, a servo amplifier in each of said circuits having an input and an output connected to a servomotor, each of said servomotors being mechanically coupled to the adjustable arm of the main balancing potentiometer in the amplitude comparison circuit in which the amplifier for that servomotor is associated, an auxiliary potentiometer in each of said circuits connected across said potential source and having an adjustable arm mechanically coupled to be driven from the servomotor associated with one of the amplitude comparison circuits and electrically connected to supply a voltage in a circuit connected to the input of the servo amplifier in the opposite amplitude comparison circuit.

References Cited in the file of this patent
UNITED STATES PATENTS

| | | |
|---|---|---|
| 2,243,379 | Johnson | May 27, 1941 |
| 2,293,371 | Van Degrift | Aug. 18, 1942 |
| 2,363,373 | Werner | Nov. 21, 1944 |
| 2,500,013 | Svensson | Mar. 7, 1950 |
| 2,636,381 | Hagg | Apr. 28, 1953 |
| 2,706,399 | Federn | Apr. 19, 1955 |
| 2,720,781 | Federn | Oct. 18, 1955 |

UNITED STATES PATENT OFFICE
CERTIFICATE OF CORRECTION

February 10, 1959

Patent No. 2,872,819

William F. King

It is hereby certified that error appears in the printed specification of the above numbered patent requiring correction and that the said Letters Patent should read as corrected below.

Column 2, line 49, for "Patent No. 2,783,907" read -- Patent No. 2,787,907 --; column 3, line 44, for "Methematically" read -- Mathematically --; column 6, line 37, for "separated" read -- separate --.

Signed and sealed this 7th day of July 1959.

(SEAL)
Attest:
KARL H. AXLINE
Attesting Officer

ROBERT C. WATSON
Commissioner of Patents